(12) United States Patent
Kaijima et al.

(10) Patent No.: US 10,169,420 B2
(45) Date of Patent: *Jan. 1, 2019

(54) TABLE PARTITIONING AND STORAGE IN A DATABASE

(71) Applicant: International Business Machines Corporation, Armonk, NY (US)

(72) Inventors: Soh Kaijima, Yamato (JP); Masahiro Ohkawa, Yamato (JP); Akira Sakaguchi, Yamato (JP); Masakazu Sano, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,581

(22) Filed: Oct. 27, 2017

(65) Prior Publication Data

US 2018/0052889 A1 Feb. 22, 2018

Related U.S. Application Data

(63) Continuation of application No. 12/473,322, filed on May 28, 2009, now Pat. No. 9,864,777.

(30) Foreign Application Priority Data

May 28, 2008 (JP) ................................ 2008-140050

(51) Int. Cl.
*G06F 17/30* (2006.01)
(52) U.S. Cl.
CPC .. *G06F 17/30492* (2013.01); *G06F 17/30306* (2013.01)

(58) Field of Classification Search
CPC .......... G06F 17/30339; G06F 17/3033; G06F 17/30466
USPC ........... 707/600–831, 899, 999.001–999.206
See application file for complete search history.

(56) References Cited

U.S. PATENT DOCUMENTS

| 5,450,595 | A | 9/1995 | Chen et al. |
| 6,363,389 | B1 | 3/2002 | Lyle et al. |
| 6,820,095 | B1 | 11/2004 | Yeung et al. |
| 6,871,341 | B1 | 3/2005 | Shyr |

(Continued)

FOREIGN PATENT DOCUMENTS

| JP | 4112260 A | 4/1992 |
| JP | 5012338 A | 1/1993 |

(Continued)

OTHER PUBLICATIONS

Wenguang Wang, "Storage Management in RDBMS," Department of Computer Science, University of Saskatchewan, Aug. 17, 2001, pp. 1-23.

*Primary Examiner* — Angelica Ruiz
(74) *Attorney, Agent, or Firm* — Winstead, P.C.

(57) ABSTRACT

A method, system and computer program product for storing a sub-table by deciding one of a plurality of table storage areas, the sub-tables resulting from partitioning of a table in a database. To provide efficient table partitioning, a database is described for distributively locating a plurality of sub-tables resulting from partitioning of a table in a database. This includes an acquiring section that monitors access occurrences to each of the sub-tables to acquire a history of access occurrences. Also a deciding section decides a table storage area in which a sub-table is to be located, based on the history of access occurrences to each of the sub-tables.

8 Claims, 7 Drawing Sheets

(56) References Cited

U.S. PATENT DOCUMENTS

| 6,886,012 B1 | 4/2005 | Phoenix et al. |
| 7,299,239 B1 | 11/2007 | Basu et al. |
| 7,831,590 B2 | 11/2010 | Gangarapu et al. |
| 7,870,128 B2 | 1/2011 | Jensen et al. |
| 7,917,512 B2 | 3/2011 | Bhide et al. |
| 2001/0010068 A1 | 7/2001 | Michael et al. |
| 2004/0193803 A1 | 9/2004 | Mogi et al. |
| 2005/0267878 A1 | 12/2005 | Mogi et al. |
| 2007/0027838 A1 | 2/2007 | Newport et al. |
| 2007/0101095 A1 | 5/2007 | Gorobets |
| 2007/0101096 A1 | 5/2007 | Gorobets |
| 2008/0059405 A1 | 3/2008 | Barsness et al. |
| 2008/0120465 A1 | 5/2008 | Brannon et al. |
| 2009/0144235 A1 | 6/2009 | Bhide et al. |

FOREIGN PATENT DOCUMENTS

| JP | 6139119 A | 5/1994 |
| JP | 6259478 A | 9/1994 |
| JP | 9212393 A | 8/1997 |
| JP | 10187505 A | 7/1998 |
| JP | 2001142752 | 5/2001 |
| JP | 2002041333 | 2/2002 |
| JP | 2003186389 A | 7/2003 |
| JP | 2003316522 A | 11/2003 |
| JP | 2004272324 A | 9/2004 |
| JP | 2006221513 A | 8/2006 |

TABLE PARTITIONING AND STORAGE IN A DATABASE

TECHNICAL FIELD

The present invention relates generally to database table partitioning and storage, and more particularly to selecting locations of sub-tables resulting from partitioning of a table in a database.

BACKGROUND

Establishment of Sarbanes-Oxley Act has increased the amount of data to be saved in service, which has led to the use of a storage system having a very large storage capacity, such as a SAN (Storage Area Network). However, the increase in the amount of data to be held increases the maintenance cost for holding data. Accordingly, there is a demand for efficient data management that stores data with a high access frequency in a storage device which has an excellent access performance with a high maintenance cost, and stores data with a low access frequency in a storage device which has a poor access performance with a low maintenance cost. Such data management will hereinafter be called information life cycle management.

There is a technique called table partitioning which partitions one table in a database into a plurality of sub-tables and stores the sub-tables in physically different storage areas. Such a table partitioning technique easily loads a vast amount of new records in a table and deletes records whose save periods have expired from the table.

SUMMARY

In one embodiment of the present invention, a method for storing a sub-table by deciding one of a plurality of table storage areas, the sub-tables resulting from partitioning of a table in a database, the method comprises acquiring a history of access occurrences to each of the sub-tables. The method further comprises deciding a location of the table storage area in which a sub-table is to be located, based on the history of access occurrences to each of the sub-tables. The method additionally comprises storing the sub-table in the location. Furthermore, the method comprises prioritizing the plurality of table storage areas in descending order of access to the table storage areas. Additionally, the method comprises changing the location of a sub-table having a higher access frequency to a table storage area having a higher priority as compared with a sub-table having a lower access frequency. In addition, the method comprises acquiring an access frequency of each of the sub-tables based on the history of access occurrences to each of the sub-tables. The method further comprises calculating a hit rate that is a ratio of accessed records to all records per access for each of the sub-tables based on the history of access occurrences to each of the sub-tables. The method additionally comprises deciding the location of the table storage area where each of the sub-tables is to be located, based on the access frequency and the hit rate.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Each of tables partitioned by database partitioning may be stored in a storage device in consideration of the information life cycle management. In the database partitioning, however, because a user designates a partition range of a table, it is difficult to perform optimal partitioning when the table to be partitioned contains a vast amount of records.

According to one aspect of the described embodiments, there is provided a database decision apparatus for deciding in which one of a plurality of table storage areas each of a plurality of sub-tables resulting from partitioning of a table in a database is located, which includes an acquiring section that acquires a history of access occurrences to each of the sub-tables, and a deciding section that decides a table storage area in which a sub-table is to be located, based on the history of access occurrences to each of the sub-tables. Further, there are provided a database apparatus using such a database decision apparatus, a program which allows a computer to function as such a database decision apparatus, and a decision method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
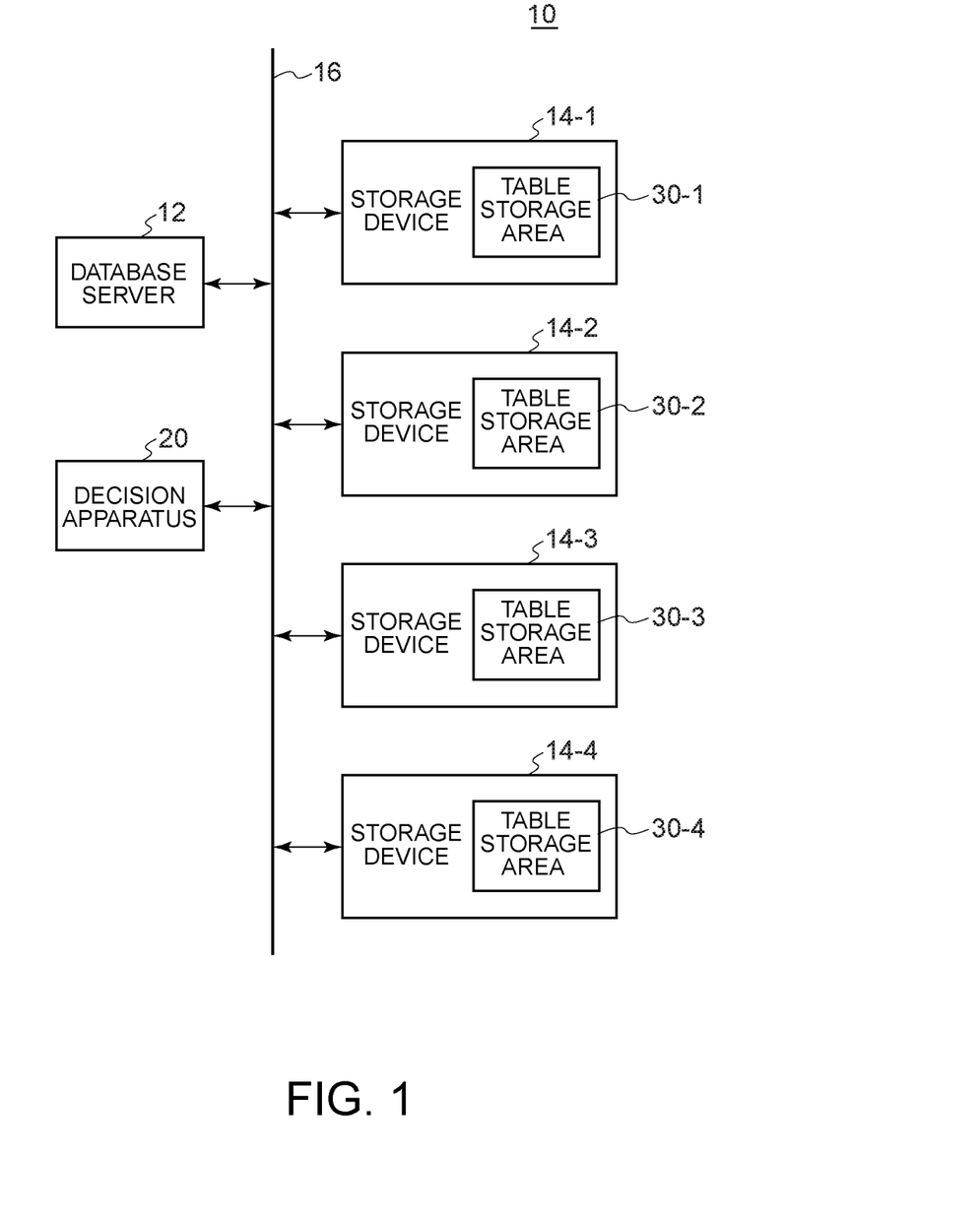
FIG. 1 illustrates the configuration of the database apparatus 10 according to one embodiment.

FIG. 1 illustrates the configuration of a database apparatus 10 according to this embodiment. The database apparatus 10 includes a database server 12, a plurality of storage devices 14, and a database decision apparatus 20. The database server 12 receives a database request from another apparatus, and executes a database process according to the received database request.

Each of the storage devices 14 stores a table in a database which is managed by the database server 12. Each of the storage devices 14 has a table storage area 30 to store a table allocated to that storage device 14. The table storage area 30 is called table space, for example. Further, each of the storage devices 14 may be connected to the database server 12 over a network 16.

The database decision apparatus 20 decides the locations of tables to be stored in a plurality of table storage areas 30. The detailed configuration of the database decision apparatus 20 will be described later referring to FIG. 3 and subsequent diagrams. The database decision apparatus 20 may be located separately from the database server 12, or co-located in instructions of the memory of the database server 12. It is shown graphically separated, but as understood by those of ordinary skill, programmatic instructions for the decision apparatus 20 may run in the processor of the database server 12, as part of the commonly executed code by a computer (see for example, FIG. 8 and discussion below).

Figure 2:
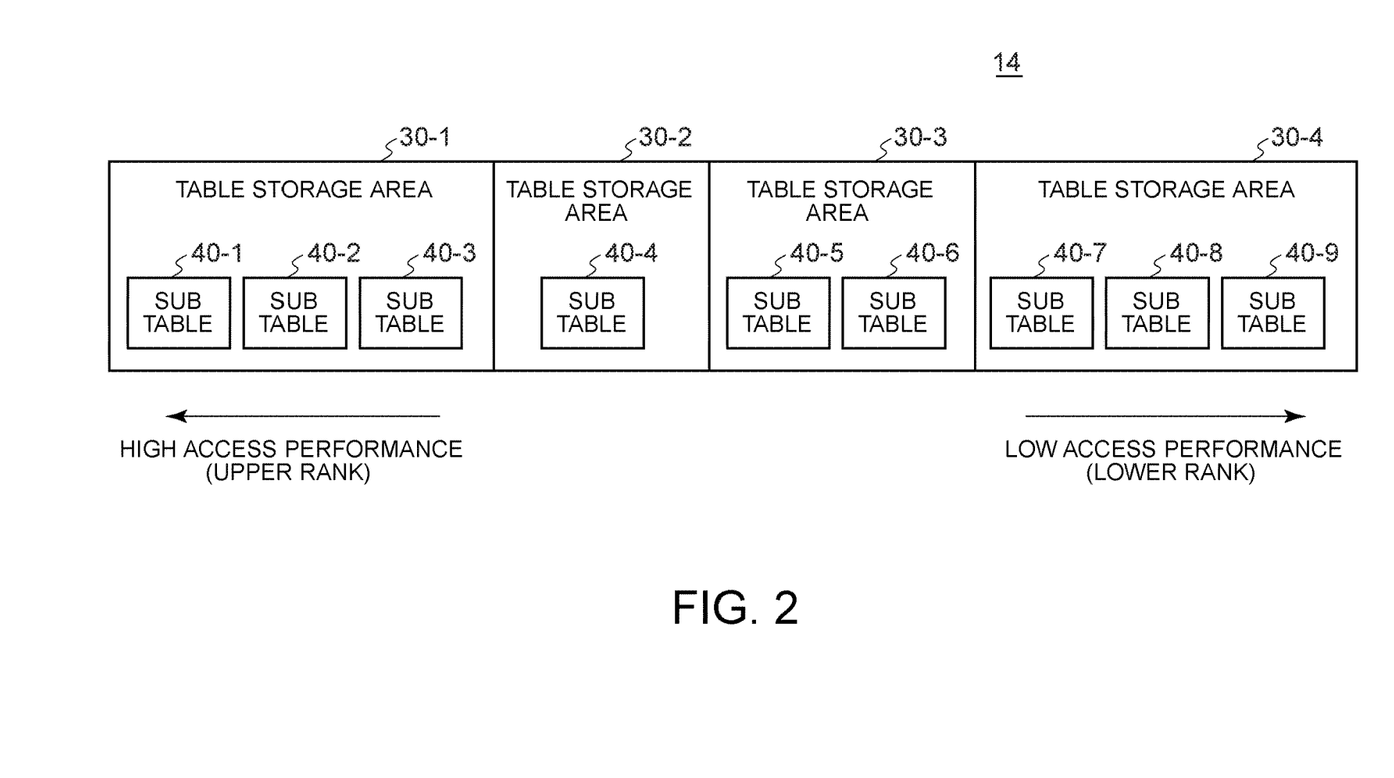
FIG. 2 illustrates one example of a plurality of table storage areas 30 and a plurality of sub-tables 40 to be stored therein.

FIG. 2 illustrates one example of a plurality of table storage areas 30 and a plurality of sub-tables 40 to be stored therein. The database apparatus 10 distributively locates a plurality of sub-tables 40 resulting from partitioning of a table in a database in a plurality of table storage areas 30. That is, the database apparatus 10 stores a plurality of sub-tables 40, generated by executing table partitioning, in a plurality of table storage areas 30. As one example, the database apparatus 10 may distributively locate a plurality of sub-tables 40, generated by partitioning a single table for each range of a value of a designated key (e.g., column), to a plurality of table storage areas 30.

The table storage areas 30 are prioritized in descending order of access occurrences of the storage devices 14 to which the table storage areas are respectively allocated. A storage device 14 having a high access may be the one having a high throughput. Alternatively, a storage device 14 having a high access may be the one having a fast access speed.

Figure 3:
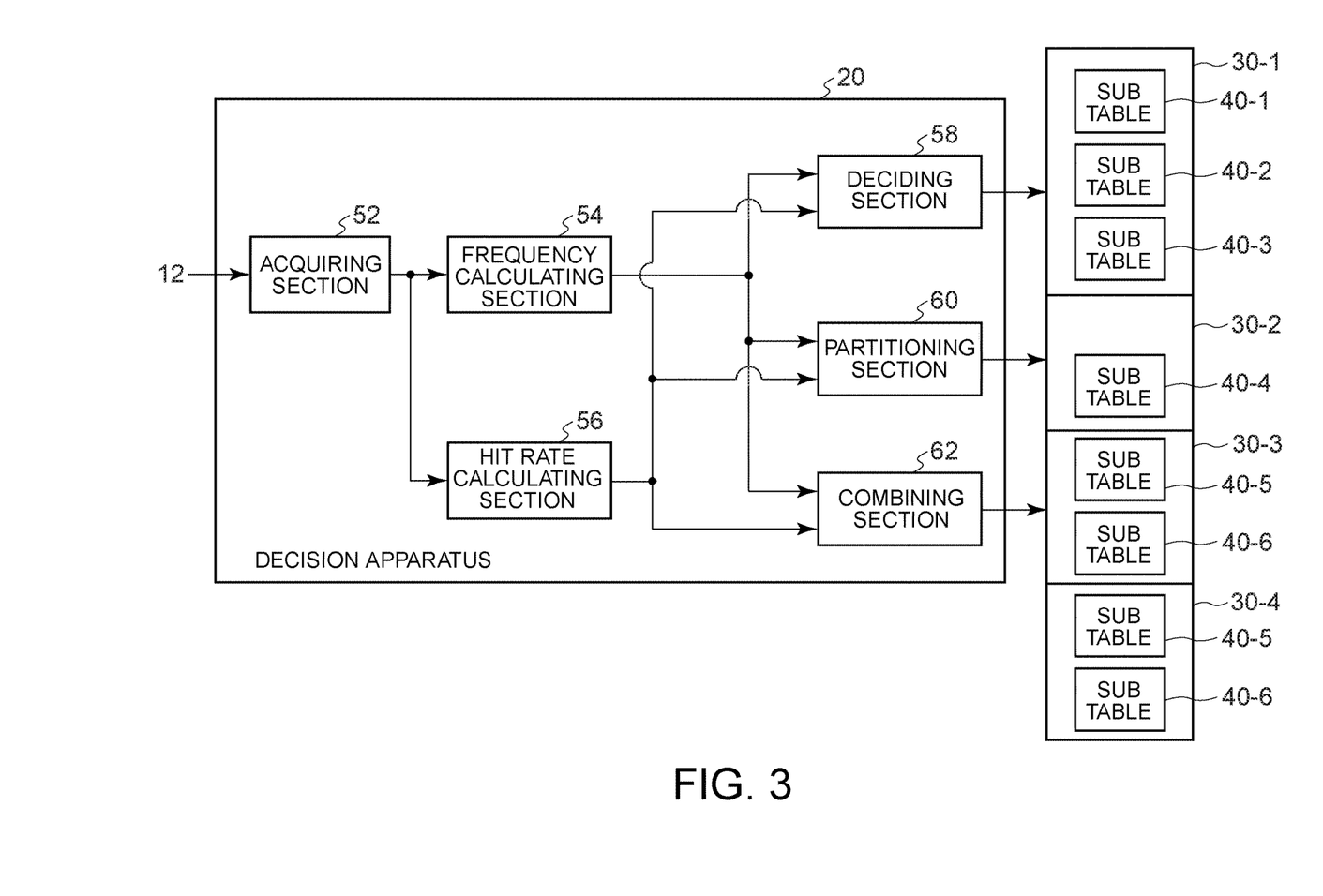
FIG. 3 illustrates the functional configuration of the database decision apparatus 20 according to the embodiment together with a plurality of table storage areas 30.

FIG. 3 illustrates the functional configuration of the database decision apparatus 20 according to the embodiment together with a plurality of table storage areas 30. The database decision apparatus 20 decides in which one of a plurality of table storage areas 30 each of a plurality of sub-tables 40 acquired by partitioning a table in a database is located. Storage locations of the sub-tables 40 in the table storage areas 30 are changed according to the decision.

The database decision apparatus 20 has an acquiring section 52, a frequency calculating section 54, a hit rate calculating section 56, a deciding section 58, a partitioning section 60, and a combining section 62. The acquiring section 52 monitors access occurrences to each sub-table 40 to acquire a history of access occurrences thereto.

The frequency calculating section 54 acquires an access frequency of each sub-table 40 based on the history of access occurrences thereto acquired by the acquiring section 52. The hit rate calculating section 56 acquires, as a hit rate, the ratio of accessed records to all records per access for each sub-table 40, based on the history of access occurrences thereto.

The deciding section 58 decides a table storage area 30 where a sub-table 40 is to be located, based on the history of access occurrences to each sub-table 40. More specifically, the deciding section 58 decides a table storage area 30 where a sub-table 40 is to be located, based on the access frequency and hit rate.

As one example, the deciding section 58 may change a location of a sub-table 40 having a higher access frequency to a table storage area 30 having a higher priority order as compared with a sub-table 40 having a lower access frequency. Alternatively, as one example, the deciding section 58 may change a location of a sub-table having a larger product of the access frequency and hit rate to a table storage area having a higher priority.

The partitioning section 60 further partitions a sub-table 40 having a higher access frequency and a lower hit rate into two or more sub-tables 40. The combining section 62 combines two or more sub-tables having a high access frequency and a high hit rate into a single sub-table 40.

Further, the combining section 62 combines two or more sub-tables having a low access frequency and a low hit rate into a single sub-table 40.

Figure 4:
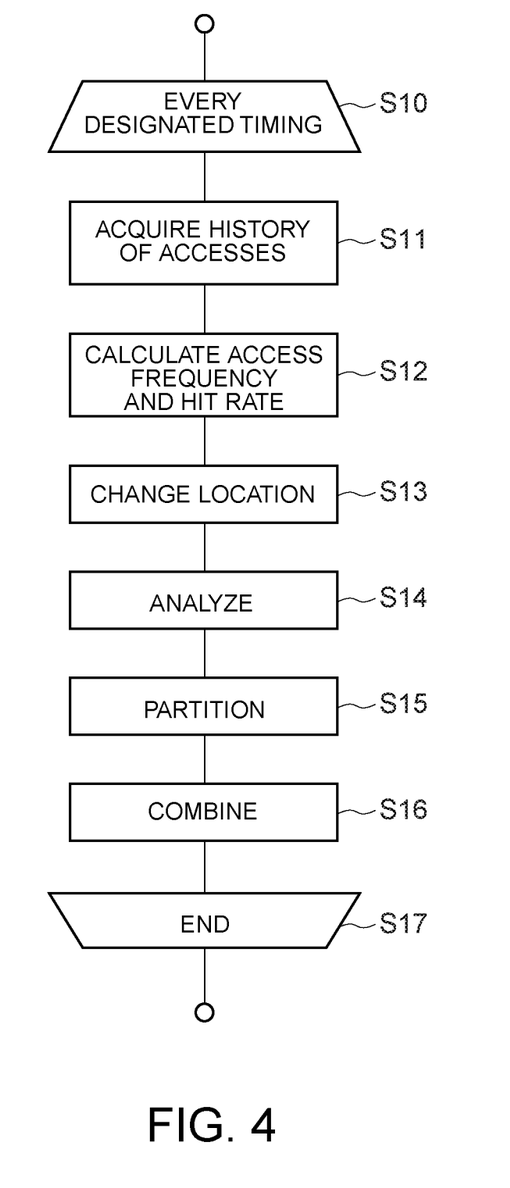
FIG. 4 illustrates the process flow of the database decision apparatus 20 according to one embodiment.
Figure 5:
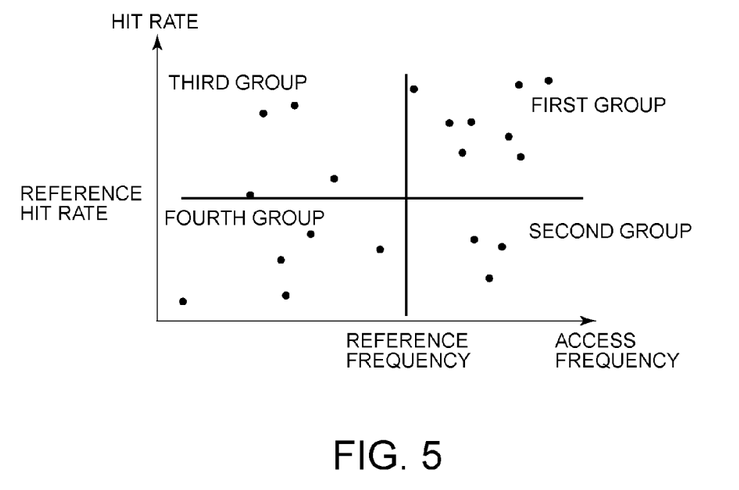
FIG. 5 illustrates a first example of the result of plotting the access frequency and hit rate of each of a plurality of sub-tables 40, and the result of classifying a plurality of sub-tables 40.
Figure 6:
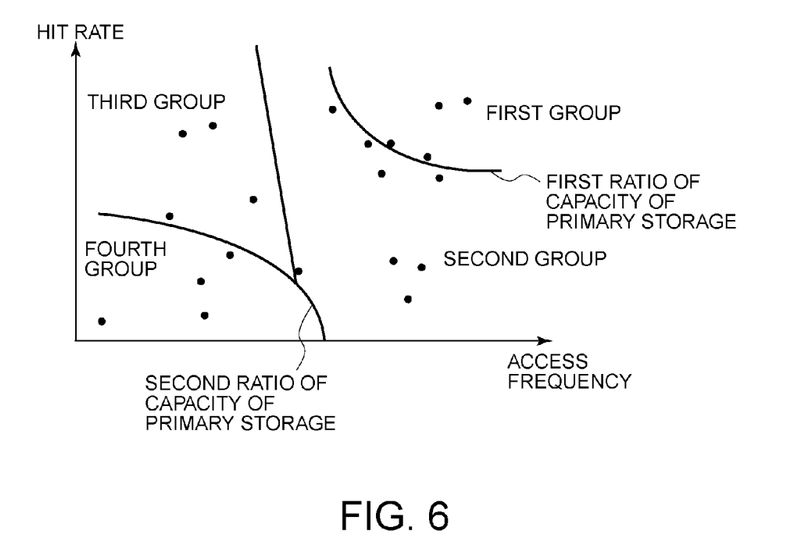
FIG. 6 illustrates a second example of the result of plotting the access frequency and hit rate of each of a plurality of sub-tables 40, and the result of classifying a plurality of sub-tables 40.

FIG. 4 illustrates a process flow of the database decision apparatus 20 according to the embodiment. FIGS. 5 and 6 show examples of the result of plotting the access frequency and hit rate of each of the sub-tables 40, and the result of classifying the sub-tables 40.

The database decision apparatus 20 executes the following steps S11 to S16 every designated timing (S10, S17). As one example, the decision apparatus 20 may execute the processing in steps S11 to S16 at regular intervals or every arbitrary timing designated by a user.

First, in step S11, the acquiring section 52 acquires a history of access occurrences to each sub-table 40. The acquiring section 52 acquires an access history for each sub-table 40 by monitoring each sub-table 40 for a given period. As one example, the acquiring section 52 may acquire an access history for each sub-table 40 by monitoring each sub-table 40 for several hours, one day, one month or the like, for example.

The acquiring section 52 may acquire, as an access history, an access frequency for each sub-table 40 in a given period, and the number of records (e.g., the number of rows) read or written in each access. The number of records read in each access may be the number of records contained in a corresponding sub-table 40 in a record range which is designated as a condition in a database request, as one example.

As one example, the acquiring section 52 may acquire the access frequency and the number of records read or written in each access by giving a snapshot command to the database server 12. With the snapshot command given, the database server 12 returns the result of accessing to a designated table. The acquiring section 52 analyzes the result of the response to the snapshot command acquired from the database server 12 to calculate an access frequency and the number of records read or written in each access.

Subsequently, in step S12, the frequency calculating section 54 calculates an access frequency for each sub-table 40 in a given period based on the history of access occurrences to each sub-table 40 for the given period. Further, in step S12, the hit rate calculating section 56 calculates a hit rate for each sub-table 40 based on the history of access occurrences to each sub-table 40 for the given period. As one example, the hit rate calculating section 56 may acquire the ratio of accessed records to all records per access for each sub-table 40 as a hit rate, based on the number of records read or written in each access.

Then, in step S13, the deciding section 58 changes locations of the sub-tables 40 to be stored in the table storage areas 30, based on the access frequency and the hit rate of each sub-table 40. As one example, the deciding section 58 changes a location of a sub-table 40 having a higher access frequency to a table storage area 30 having a higher priority. Accordingly, the deciding section 58 can locate a sub-table 40 having a higher access frequency to a table storage area 30 having a higher access.

Alternatively, the deciding section 58 may change a location of a sub-table 40 having a larger product of the access frequency and hit rate to a table storage area 30 having a higher priority. Accordingly, the deciding section 58 can locate a sub-table 40 having a larger number of records accessed in a given period to a table storage area 30 having a higher access.

Next, in step S14, the partitioning section 60 classifies each sub-table 40 according to the access frequency and the hit rate of that sub-table 40. More specifically, the partitioning section 60 classifies each sub-table 40 into one of a first group which has both a high access frequency and a high hit rate, a second group which has a high access frequency and a low hit rate, a third group which has a low access frequency and a high hit rate, and a fourth group which has both a low access frequency and a low hit rate.

The first to fourth groups may be classified as shown in FIG. 5, for example. That is, as one example, the first group may have an access frequency higher than a reference frequency and a hit rate higher than a reference hit rate. As one example, the second group may have an access frequency higher than the reference frequency and a hit rate equal to or lower than the reference hit rate. As one example, the third group may have an access frequency equal to or lower than the reference frequency and a hit rate higher than the reference hit rate. As one example, the fourth group may have an access frequency equal to or lower than the reference frequency and a hit rate equal to or lower than the reference hit rate.

In this way, the partitioning section 60 can easily classify a plurality of sub-tables 40. The partitioning section 60 may classify a plurality of sub-tables 40 with the average access frequency of the sub-tables 40 being taken as a reference frequency. The partitioning section 60 may also classify a plurality of sub-tables 40 based on a reference frequency designated by the user. The partitioning section 60 may classify a plurality of sub-tables 40 with the average hit rate of the sub-tables 40 being taken as a reference hit rate. The partitioning section 60 may also classify a plurality of sub-tables 40 based on a reference hit rate designated by the user.

Alternatively, the first to fourth groups may be classified as shown in FIG. 6, for example. That is, the first group may include selected sub-tables 40 whose total capacity is up to a first ratio of the capacity of a primary storage (e.g., 20% of the capacity of the primary storage) when the sub-tables 40 are selected in an order from a higher score obtained by multiplying the access frequency by the hit rate. The primary storage is a storage with a higher priority of usage in those storages which are used by a computer, and, for example, is a fast and safe storage in all the storages used. The capacity of the primary storage represents an available physical area in the primary storage.

The fourth group may include selected sub-tables 40 excluding those sub-tables 40 whose total capacity is up to a second ratio of the capacity of a primary storage (e.g., 80% of the capacity of the primary storage) when the sub-tables 40 are selected in an order from a higher score mentioned above. In this case, the second ratio is larger than the first ratio.

The second group may include all the sub-tables 40 excluding the first group and the second group, with the score obtained by multiplying the access frequency by the hit rate belonging to an upper 50%. The third group may include all the sub-tables 40 excluding the first group and the second group, with the score obtained by multiplying the access frequency by the hit rate belonging to a lower 50%.

This partitioning section 60 can easily classify a plurality of sub-tables 40 even when a table storage area 30, for example, is added. The score is not limited to a value obtained by multiplying the access frequency by the hit rate, but may be a value obtained by, for example, adding the access frequency multiplied by a first coefficient to the hit rate multiplied by a second coefficient.

Subsequently, in step S15, the partitioning section 60 further partitions each of the sub-tables 40 belonging to the second group into two or more sub-tables 40. As one example, the partitioning section 60 may further partition a sub-table 40 whose hit rate is equal to or lower than the reference hit rate into two or more sub-tables 40.

That is, because each of the sub-tables 40 belonging to the second group has a low hit rate while having a high access frequency, it contains a mixture of records to be accessed at a high frequency and records to be accessed at a low frequency, with the ratio of the records to be accessed at a high frequency being small as compared with the records to be accessed at a low frequency. Such a sub-table 40 contains at least records to be accessed at a high frequency, and is thus desirably located in the table storage area 30 which is allocated to a storage device 14 having a high access, but also contains a lot of records to be accessed at a low frequency, suffering a poor efficiency. In this respect, the partitioning section 60 further partitions each of the sub-tables 40 belonging to the second group to a sub-table 40 which has a high ratio of the records to be accessed at a high frequency and a sub-table 40 which contains only records to be accessed at a low frequency.

The partitioning section 60 may partition each of the sub-tables 40 belonging to the second group into sub-tables whose quantity accords to the reciprocal of the hit rate. That is, when the hit rate is ⅕, for example, the partitioning section 60 may partition each of the sub-tables 40 belonging to the second group into five sub-tables whose quantity is the reciprocal of the hit rate. Accordingly, because the partitioning section 60 partitions each sub-table 40 for records to be accessed at a high frequency, which are estimated to be contained in that sub-table 40, it increases a probability of generating sub-tables 40 having a higher ratio of records to be accessed at a high frequency.

Alternatively, as one example, the partitioning section 60 may change the number of partitions according to the hit rate of a sub-table 40 to be partitioned. As one example, the partitioning section 60 may partition each sub-table 40 into a greater number of sub-tables when the hit rate is low, and may partition each sub-table 40 into a smaller number of sub-tables when the hit rate is high.

Subsequently, in step S16, the combining section 62 combines two or more sub-tables 40 belonging to the first group into a single sub-table 40. As one example, the combining section 62 may combine two or more sub-tables 40 having an access frequency higher than the reference frequency and a hit rate higher than the reference hit rate into a single sub-table 40. In this case, as one example, the combining section 62 may combine two or more sub-tables 40 into a single sub-table 40 on condition that the range of the value of a key used in partitioning the sub-tables 40 is continuous.

Further, the combining section 62 combines two or more sub-tables 40 belonging to the fourth group into a single sub-table 40. As one example, the combining section 62 may combine two or more sub-tables 40 having an access frequency equal to or lower than the reference frequency and a hit rate equal to or lower than the reference hit rate into a single sub-table 40. In this case, as one example, the combining section 62 may combine two or more sub-tables 40 into a single sub-table 40 on condition that the range of the value of a key used in partitioning the sub-tables 40 is continuous.

Then, the decision apparatus 20 repetitively executes the processing in steps S11 to S16 (S10, S17). Accordingly, in step S12 in each repetitive processing, the frequency calculating section 54 and the hit rate calculating section 56 newly calculate an access frequency and a hit rate for each of a plurality of sub-tables 40 after partitioning performed by the partitioning section 60 in the previous repetitive processing. The deciding section 58 decides a table storage area 30 where each of a plurality of new sub-tables 40 is to be located, based on the newly calculated access frequency and hit rate.

When a sub-table 40 having both a high access frequency and a high hit rate (e.g., a sub-table 40 having an access frequency higher than the reference frequency and a hit rate higher than the reference hit rate) is newly generated as a consequence of partitioning a sub-table 40 belonging to the second group, the location of the newly generated sub-table 40 can be changed to the first group. When a sub-table 40 having both a low access frequency and a low hit rate (e.g., a sub-table 40 having an access frequency equal to or lower than the reference frequency and a hit rate equal to or lower than the reference hit rate) is newly generated as a consequence of partitioning a sub-table 40 belonging to the second group, the location of the newly generated sub-tables 40 can be changed to the fourth group.

Further, the combining section 62 combines the newly generated sub-table 40 whose location has been changed to the first group from the second group with the sub-table 40 originally belonging to the first group. This can suppress an increase in the number of sub-tables 40 belonging to the first group. The combining section 62 also combines the newly generated sub-table 40 whose location has been changed to the fourth group from the second group with the sub-table 40 originally belonging to the fourth group. This can suppress an increase in the number of sub-tables 40 belonging to the fourth group.

The database decision apparatus 20 according to the foregoing embodiment partitions a sub-table 40 containing a mixture of records to be accessed at a high frequency and records to be accessed at a low frequency, with the ratio of the records to be accessed at a high frequency being small, into two or more sub-tables 40. As a result, the decision apparatus 20 can further partition such a sub-table 40 into a sub-table 40 having a large ratio of records to be accessed at a high frequency, and a sub-table 40 containing only records to be accessed at a low frequency. Then, the deciding section 58 can move the sub-table 40 containing only records to be accessed at a low frequency to a table storage area 30 which is allocated to a storage device 14 with a lower access.

Accordingly, the decision apparatus 20 can remove records to be accessed at a low frequency from a table storage area 30 which is allocated to a storage device 14 with a high access. Therefore, the database apparatus 10 having the decision apparatus 20 can execute efficient table partitioning.

Figure 7:
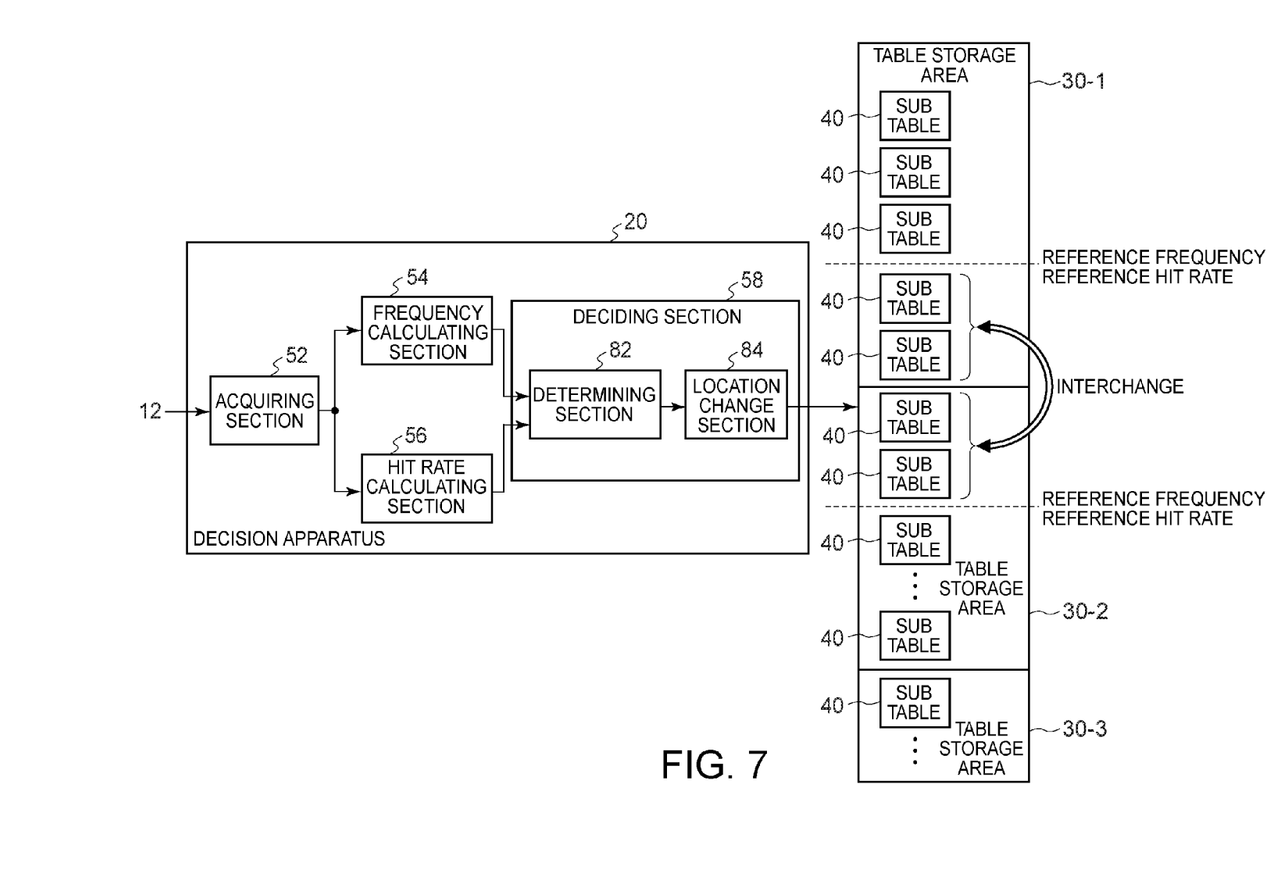
FIG. 7 illustrates the configuration of a database decision apparatus 20 according to an embodiment of the invention.

FIG. 7 illustrates the configuration of a decision apparatus 20 according to a modified embodiment together with a plurality of table storage areas 30. Because the deciding section 58 according to the modified embodiment has approximately the same functions and configuration as those of the decision apparatus 20 according to the embodiment described referring to FIG. 3, same reference numerals are given to those components in FIG. 7 which have approximately the same functions and structures as those components described referring to FIG. 3 to omit their descriptions except for the differences.

The database decision apparatus 20 according to the modified embodiment has an acquiring section 52, a frequency calculating section 54, a hit rate calculating section 56, and a deciding section 58. In the modified embodiment, a reference frequency and a reference hit rate which are designated by a user, for example, are set for each of a plurality of table storage areas 30.

The deciding section 58 includes a determining section 82 and a location change section 84. The determining section 82 determines whether to change the location of one of two or more sub-tables 40 located in one table storage area 30-2 whose access frequency and hit rate are respectively higher than the reference frequency and reference hit rate of the one table storage area 30-2, and the location of another one of two or more sub-tables located in another table storage area 30-1 having a higher priority than the one table storage area 30-2, whose access frequency and hit rate are respectively equal to or lower than the reference frequency and reference hit rate of the other table storage area 30-1. When it is determined that the locations of the one sub-table 40 and the other sub-table 40 are to be changed, the location change section 84 changes the location of the one sub-table 40 to the other table storage area 30-1, and changes the location of the other sub-table 40 to the one table storage area 30-2. This database decision apparatus 20 can locate a sub-table 40 having a high access frequency and high hit rate in a table storage area 30 having a high access.

As one example, the determining section 82 may compare the score of a sub-table 40 located in one table storage area 30-2, which is based on the access frequency and the hit rate and is the highest score in the one table storage area 30-2, with the score of a sub-table 40 located in another table storage area 30-1 having a higher priority than the one table storage area 30-2, which is the lowest score in the other table storage area 30-1. Then, as one example, the determining section 82 may change the location of the one sub-table 40 to the other table storage area 30-1, and change the location of the other sub-table 40 to the one table storage area 30-1. In this manner, the decision apparatus 20 can locate a sub-table 40 having a high access frequency and high hit rate to a table storage area 30 having a high access.

Figure 8:
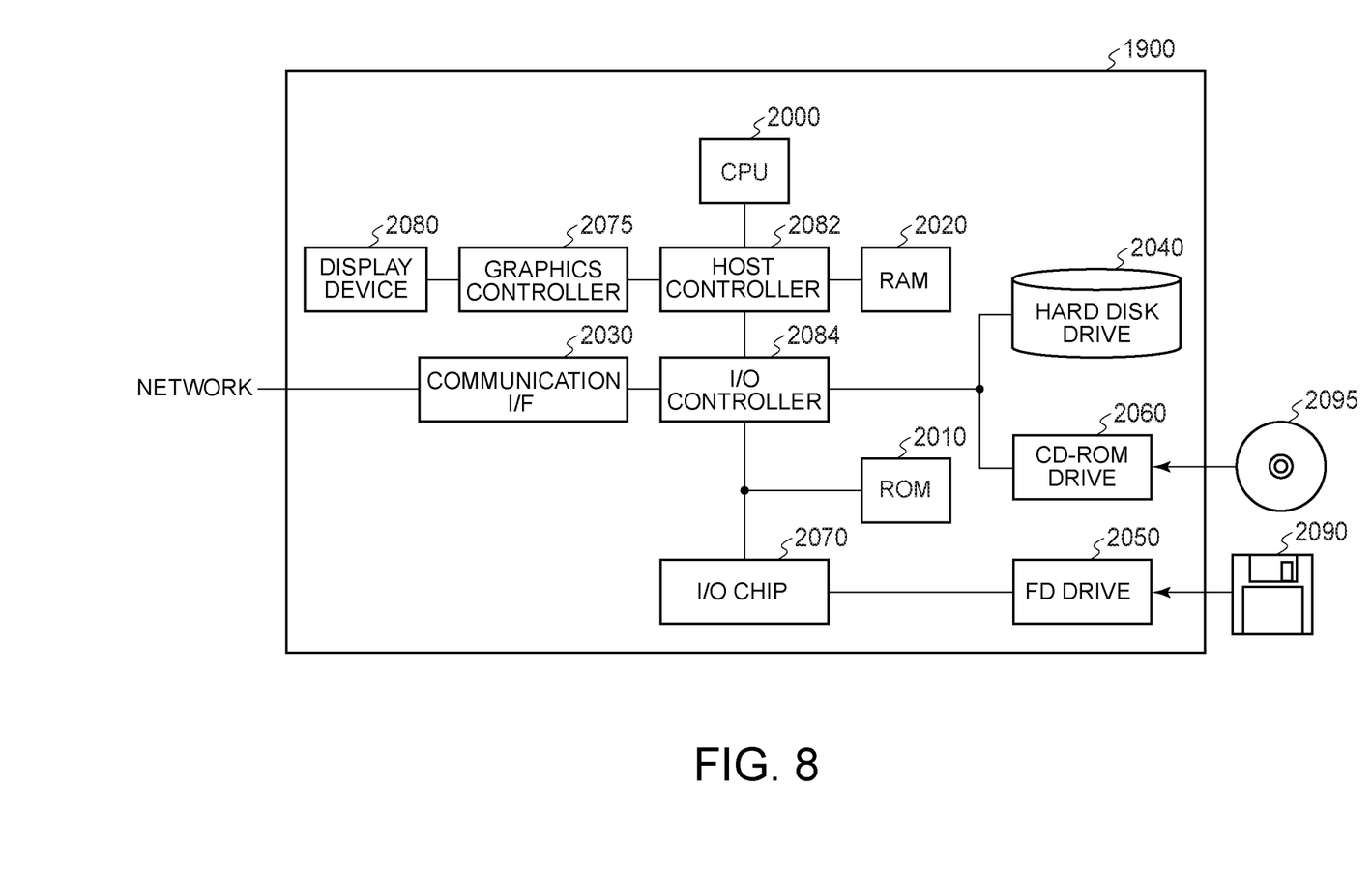
FIG. 8 illustrates one example of the hardware configuration of the computer 1900 according to an embodiment of the invention.

The database decision apparatus may be executed as a special purpose computer, including for example, a database server. FIG. 8 illustrates one example of the hardware configuration of a computer 1900 according to the embodiment. The computer 1900 includes a processor (CPU) 2000 and peripheral section that has a memory, RAM 2020, a graphics controller 2075, and a display device 2080 which are mutually connected by a host controller 2082. The computer 1900 also includes an input/output section that has a communication interface 2030, a hard disk drive 2040, and a CD-ROM drive 2060, which are connected to the host controller 2082 via an input/output controller 2084. The computer 1900 further includes a legacy input/output section that has a ROM 2010, a flexible disk drive 2050 and an input/output chip 2070, which are connected to the input/output controller 2084.

The host controller 2082 connects the RAM 2020 to the CPU 2000 and the graphics controller 2075, which access the RAM 2020 at a high transfer rate. The CPU 2000 operates to control the individual sections based on programs stored in the ROM 2010 and the RAM 2020. The graphics controller 2075 acquires image data which is generated by the CPU 2000 or the like on a frame buffer provided in the RAM 2020. Alternatively, the graphics controller 2075 may include a frame buffer inside to store image data generated by the CPU 2000 or the like.

The input/output controller 2084 connects the host controller 2082 to the communication interface 2030, the hard disk drive 2040 and the CD-ROM drive 2060, which are relatively fast input/output devices. The communication interface 2030 communicates with other devices over a network. The hard disk drive 2040 stores programs and data which the CPU 2000 in the computer 1900 uses. The CD-ROM drive 2060 reads a program or data from a CD-ROM 2095, and provides the hard disk drive 2040 with the program or data via the RAM 2020.

The input/output controller 2084 is connected with the ROM 2010, and relatively slow input/output devices, such as the flexible disk drive 2050 and the input/output chip 2070. The ROM 2010 stores a boot program which is executed when the computer 1900 is activated, and/or programs which depend on the hardware of the computer 1900. The flexible disk drive 2050 reads a program or data from a flexible disk 2090, and provides the hard disk drive 2040 with the program or data via the RAM 2020. The input/output chip 2070 connects the flexible disk drive 2050 to the input/output controller 2084, and to various kinds of input/output devices via, for example, a parallel port, a serial port, a keyboard port, a mouse port and so forth.

The program supplied to the hard disk drive 2040 via the RAM 2020 is stored in a recording medium, such as the flexible disk 2090, the CD-ROM 2095 or an IC card, and provided by a user. The program is read from the recording medium, and is installed in the hard disk drive 2040 in the computer 1900 via the RAM 2020 to be executed by the CPU 2000.

The program installed on the computer 1900 to allow the computer 1900 to function as the database decision apparatus 20 includes an acquiring module, a frequency calculating module, a hit rate calculating module, a deciding module, a partitioning module, and a combining module. Those programs or modules work on the CPU 2000 to let the computer 1900 function as the acquiring section 52, the frequency calculating section 54, the hit rate calculating section 56, the deciding section 58, the partitioning section 60 and the combining section 62.

Information processing described in those modules, when read into the computer 1900, functions as specific means realized by the cooperation of software and the above-described various hardware resources, namely the acquiring section 52, the frequency calculating section 54, the hit rate calculating section 56, the deciding section 58, the partitioning section 60 and the combining section 62. As operating or processing information according to the purpose of usage of the computer 1900 in the embodiment is achieved by those specific means, the specific database decision apparatus 20 according to the purpose is constructed.

When the computer 1900 communicates with an external device, as one example, the CPU 2000 executes a communication program loaded on the RAM 2020, and instructs the communication interface 2030 to perform communication processing based on the contents of processing described in the communication program. The communication interface 2030 reads transmission data stored in a transmission buffer area provided in a storage device, such as the RAM 2020, the hard disk drive 2040, the flexible disk 2090 or the CD-ROM 2095, and transmits it to the network, or writes reception data, received from the network, in a reception buffer area provided in the storage device under the control of the CPU 2000. The communication interface 2030 may transfer the transmission/reception data to or from the storage device by the DMA (Direct Memory Access) system, or the CPU 2000 may transfer the transmission/reception data by reading data from the storage device or the communication interface 2030 of the sender, and writing data in the communication interface 2030 or the storage device of the receiver.

The CPU 2000 allows the entire contents or a necessary portion of a file, a database or the like stored in an external storage device, such as the hard disk drive 2040, CD-ROM drive 2060 (CD-ROM 2095), or flexible disk drive 2050 (flexible disk 2090) to be read into the RAM 2020 by DMA transfer or the like, and performs various kinds of processing on the data on the RAM 2020. Then, the CPU 2000 writes processed data back to an external storage device by DMA transfer or the like. Because the RAM 2020 can be regarded to temporarily hold the contents of the external storage device in such processing, the RAM 2020 and the external storage device are generally called a memory, a storage section or a storage device in the embodiment. Various kinds of information, such as various programs, data, tables, databases, etc., are stored in such a storage device to be subjected to information processing. The CPU 2000 can hold a part of the RAM 2020 in a cache memory to read and write data therefrom and therein. Because the cache memory serves as a part of the function of the RAM 2020 even in such a mode, the cache memory is considered to be included in the RAM 2020, memory and/or storage device, unless otherwise specified distinguishably.

The CPU 2000 performs various kinds of processing including various operations, information processing, conditional determination, information retrieval and information substitution, designated by a sequence of commands of a program and described in the foregoing description of the embodiment, on the data read from the RAM 2020, and writes resultant data back into the RAM 2020. In case of making a conditional decision, for example, the CPU 2000 determines whether various parameters illustrated in the foregoing description of the embodiment satisfy a condition of being larger, smaller, equal to or greater than, equal to or lower than, or equal to another parameter or a constant, and branches to a different command sequence or calls a sub routine when the condition is satisfied (or is not satisfied).

The CPU 2000 can search for information stored in a file, a database or the like in the storage device. When a plurality of entries, in each of which the value of a first attribute is associated with the value of a second attribute, are stored in a storage device, for example, the CPU 2000 can search for an entry the attribute value of whose first attribute matches with a designated condition, and read the attribute value of the second attribute stored in the entry to acquire the attribute value of the second attribute associated with the first attribute which satisfies the predetermined condition.

The programs or modules described above may be stored in an external storage medium. An optical recording medium, such as DVD or CD, a magneto-optical recording medium, such as MO, a tape medium, a semiconductor memory, such as an IC card, and the like can be used as storage mediums in addition to the flexible disk 2090 and the CD-ROM 2095. A storage device, such as a hard disk or RAM, provided in a server system connected to a private communication network or the Internet can be used as a recording medium to provide the computer 1900 with the programs over the network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

The invention claimed is:

1. A system, comprising:
   a memory unit for storing a computer program for storing a sub-table by deciding one of a plurality of table storage areas, the sub-tables resulting from partitioning of a table in a database; and
   a processor coupled to the memory unit, wherein the processor is configured to execute the program instructions of the computer program comprising:
      acquiring a history of access occurrences to each of the sub-tables;
      deciding a location of the table storage area in which a sub-table is to be located, based on the history of access occurrences to each of the sub-tables;
      storing the sub-table in the location;
      prioritizing the plurality of table storage areas in descending order of access to the table storage areas;
      changing the location of a sub-table having a higher access frequency to a table storage area having a higher priority as compared with a sub-table having a lower access frequency;
      acquiring an access frequency of each of the sub-tables based on the history of access occurrences to each of the sub-tables;
      calculating a hit rate that is a ratio of accessed records to all records per access for each of the sub-tables based on the history of access occurrences to each of the sub-tables; and
      deciding the location of the table storage area where each of the sub-tables is to be located, based on the access frequency and the hit rate.

2. The system as recited in claim 1, wherein the program instructions of the computer program further comprise:
   partitioning a sub-table whose access frequency is higher than a reference frequency and whose hit rate is equal to or lower than a reference hit rate into two or more sub-tables;
   recalculating the access frequency and the hit rate, respectively, for each of a plurality of new sub-tables after partitioning performed by the partitioning section; and
   deciding the location of the table storage area where each of the plurality of new sub-tables is to be located, based on the access frequency and the hit rate newly calculated.

3. The system as recited in claim 2, wherein the program instructions of the computer program further comprise:
   partitioning a sub-table whose access frequency is higher than the reference frequency and whose hit rate is equal to or lower than the reference hit rate into sub-tables whose quantity accords to a reciprocal of the hit rate.

4. The system as recited in claim 1, wherein the program instructions of the computer program further comprise:
   combining two or more sub-tables whose access frequencies are higher than a reference frequency and whose hit rates are higher than a reference hit rate into a single sub-table.

5. The system as recited in claim 4, wherein the program instructions of the computer program further comprise:
   acquiring a sub-table of each of the plurality of sub-tables by partitioning the table for each range of a value of a key; and
   combining two or more sub-tables whose access frequencies are higher than the reference frequency and whose hit rates are higher than the reference hit rate into the single sub-table on condition that the range of the value of the key is continuous.

6. The system as recited in claim 1, wherein the program instructions of the computer program further comprise:
   combining two or more sub-tables whose access frequencies are equal to or lower than a reference frequency and whose hit rates are equal to or lower than a reference hit rate into a single sub-table.

7. The system as recited in claim 1, wherein the program instructions of the computer program further comprise:
   calculating the product of the access frequency and the hit rate for a plurality of the sub-tables;
   assigning priority to higher products of access frequency and hit rate; and
   deciding the location of the table storage area based upon the assigned priority.

8. The system as recited in claim 1, wherein the program instructions of the computer program further comprise:
   determining whether to change the location of one of two or more sub-tables located in one of the table storage areas whose access frequency and hit rate are respectively higher than a reference frequency and a reference hit rate of the one table storage area, and a location of another one of two or more sub-tables located in another one of the table storage areas which has a higher priority order than that of the one table storage area, and having the access frequency and the hit rate equal to or lower than a reference frequency and a reference hit rate of the other table storage area; and upon determining that the locations of the one sub-table and the other sub-table are to be changed, changing the location of the one sub-table to the other table storage area and changing the location of the other sub-table to the one table storage area.

\* \* \* \* \*